Sept. 2, 1941.  A. N. HOVLAND  2,254,963
AIRPLANE
Filed Jan. 21, 1939  4 Sheets-Sheet 1
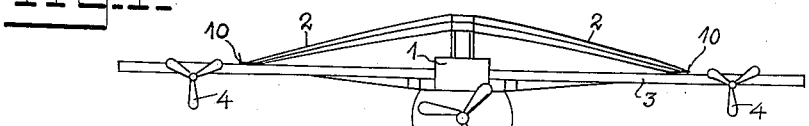
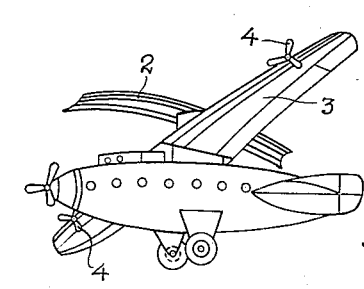
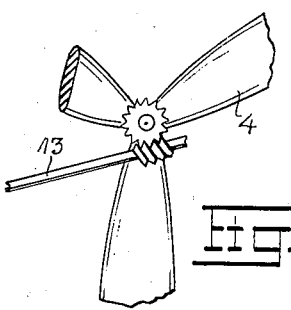
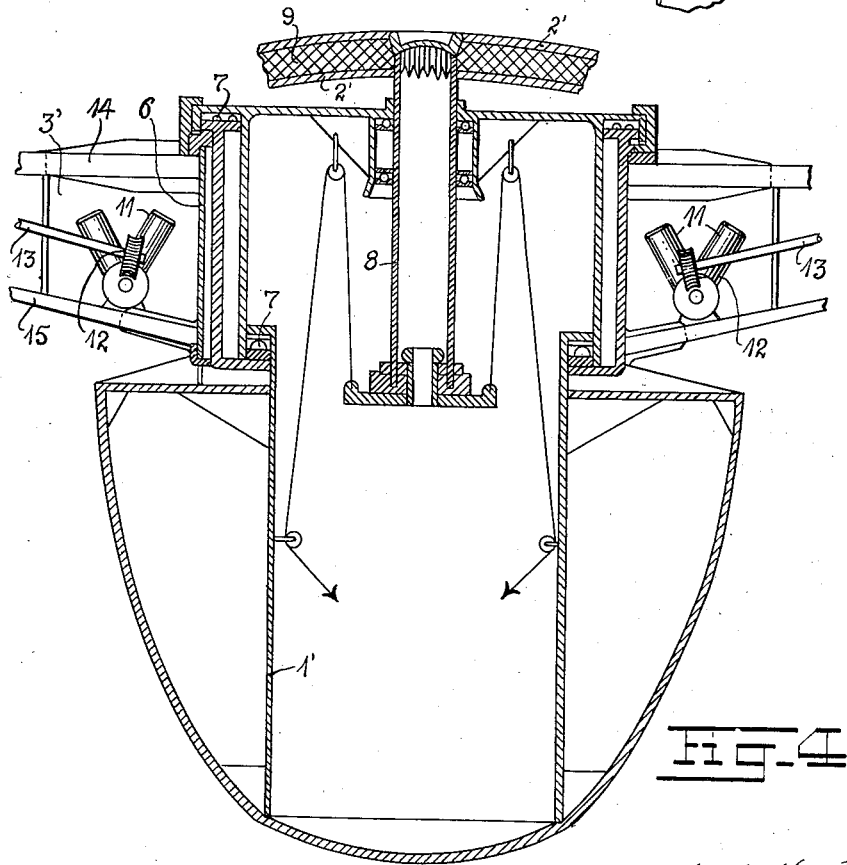
A. N. Hovland
Inventor
By: Glascock Downing & Seebold
Attys Sept. 2, 1941.                    A. N. HOVLAND                    2,254,963
                                    AIRPLANE
                              Filed Jan. 21, 1939            4 Sheets-Sheet 2
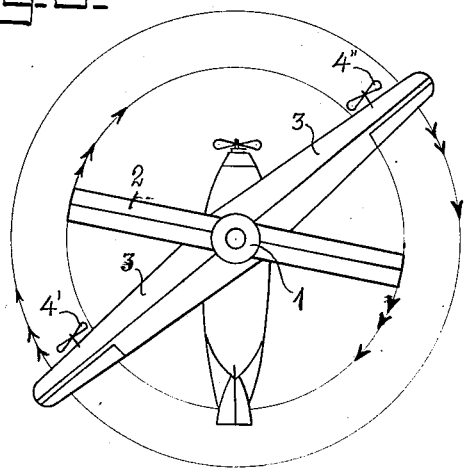
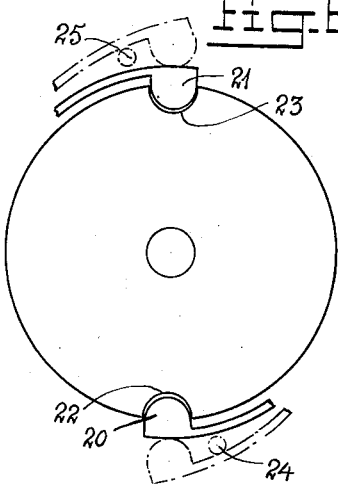
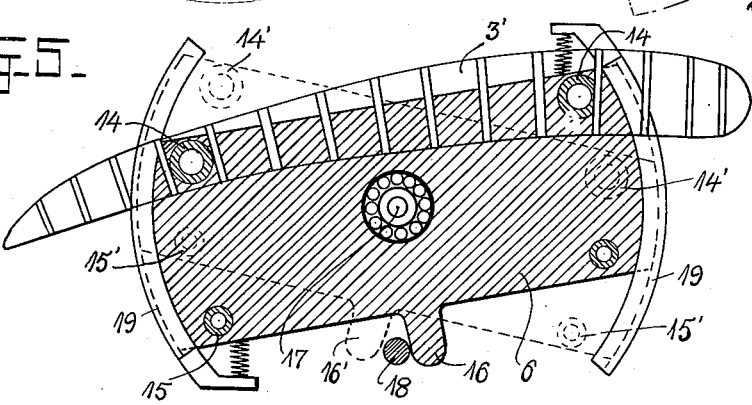
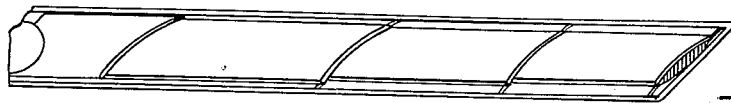
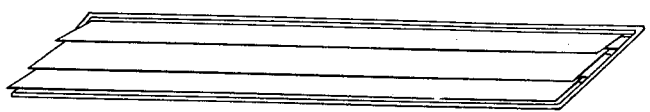

Sept. 2, 1941.  A. N. HOVLAND  2,254,963
AIRPLANE
Filed Jan. 21, 1939  4 Sheets-Sheet 3
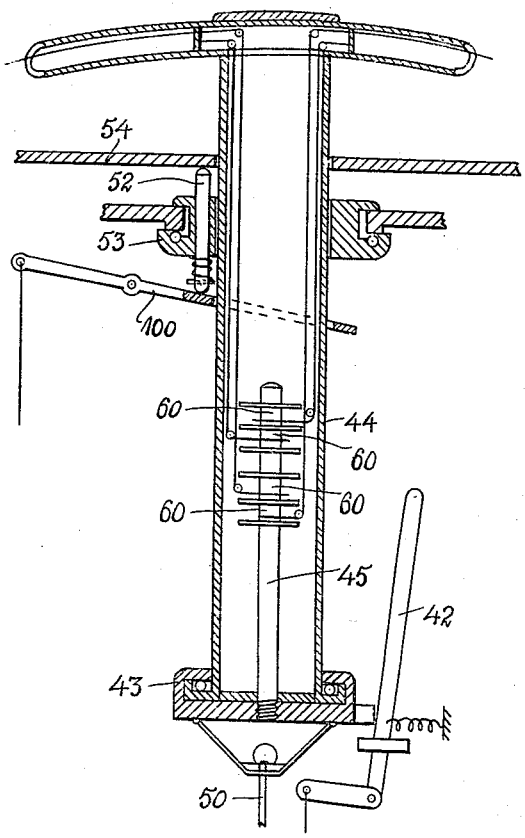
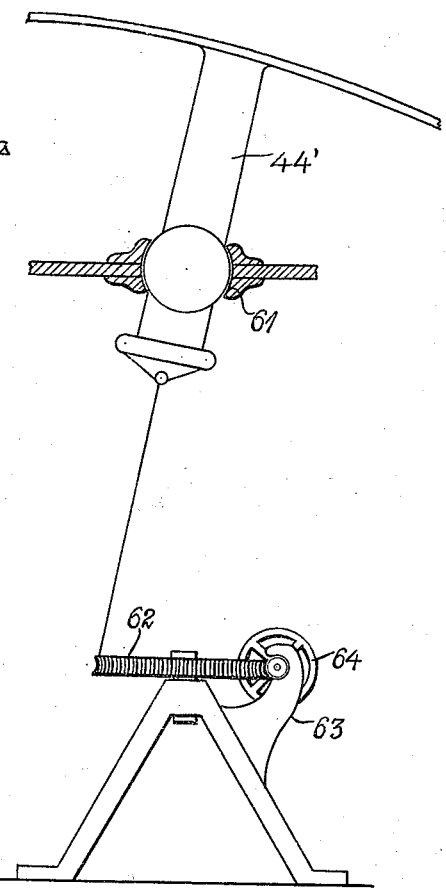
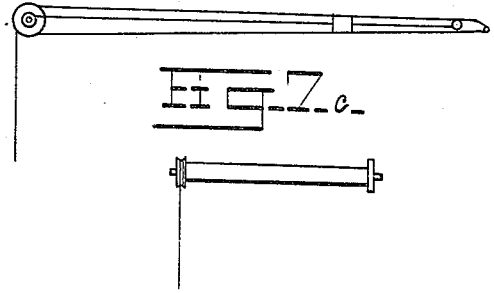
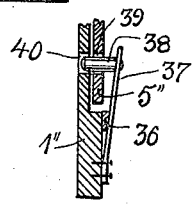
A. N. Hovland
Inventor
By Glascock Downing Seabold
Attys.

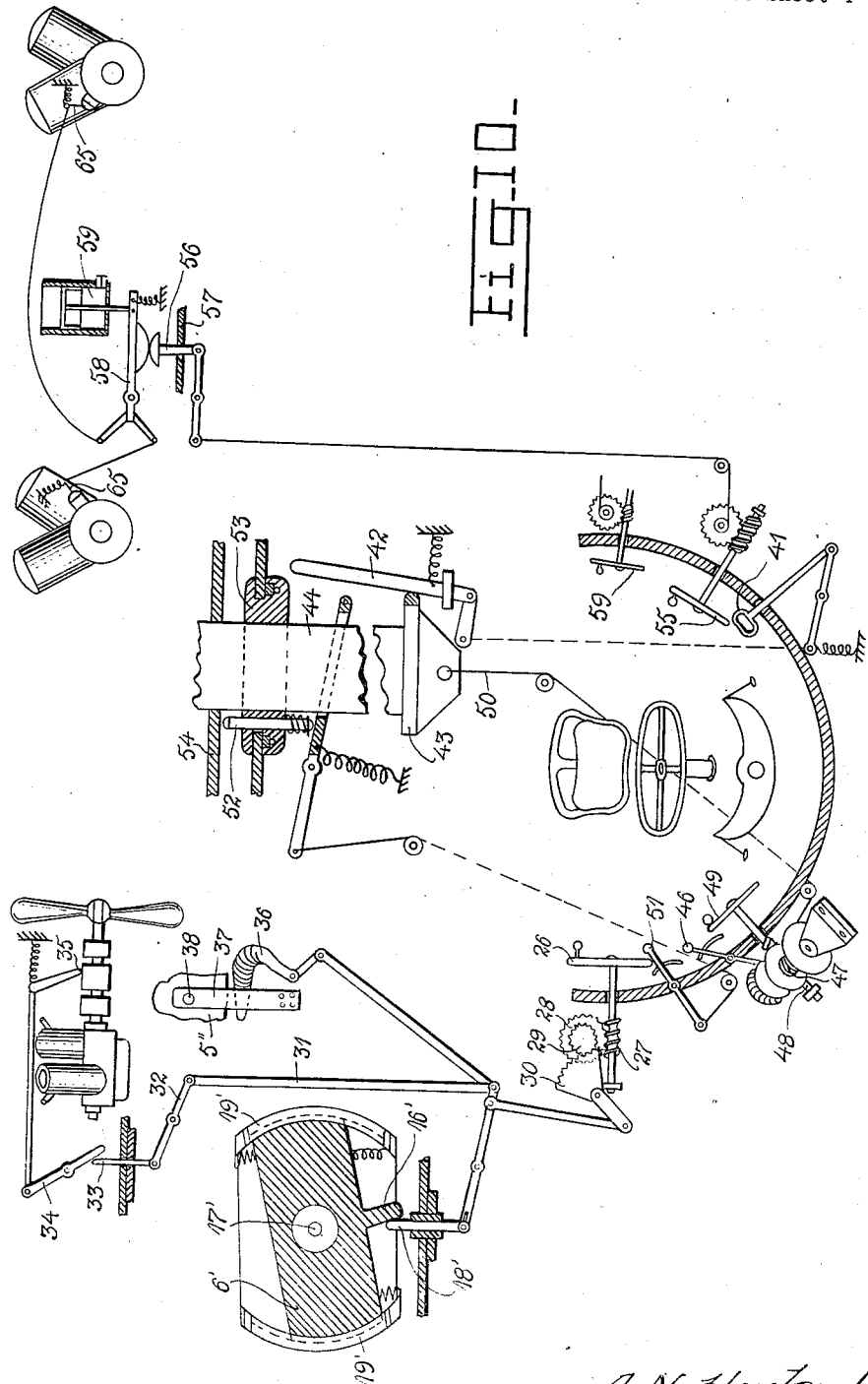

Patented Sept. 2, 1941

2,254,963

UNITED STATES PATENT OFFICE 2,254,963

AIRPLANE

Abraham Nilsen Hovland, Bestun, near Oslo, Norway

Application January 21, 1939, Serial No. 252,226
In Great Britain January 24, 1938

3 Claims. (Cl. 244—17)

The invention concerns airplanes and the object of the invention is to provide an airplane of such construction that it can ascend and descend perpendicularly or almost perpendicularly and in a convenient and safe manner change over from ascending to horizontal movement and vice versa.

According to the invention, such features are obtained by constructing the upper supporting plane or wings in such a way that it may be set in rotation about an entirely or partly vertical shaft or cylinder, at the same time as one of the wings is tilted about its longitudinal axis, so that it acts as a large propeller or airscrew.

In order to set the wings in rotation, there may be employed a smaller propeller on each wing or only on one wing, whereby greater speed of revolution is attained.

The supporting plane or wings can be brought to a standstill in a transverse position to the longitudinal axis of the airplane, while at the same time one of the wings which has been tilted is made to tilt back again and its propeller is brought into forward-driving movement either by setting the propeller blades or by a gear arrangement or by reversing its motor.

The two propellers then drive the airplane forwards, and the upper plane serves as an ordinary machine to keep it up.

This invention also comprises the novel feature of providing a stabilizing propeller above the upper supporting plane which is made to rotate by the lower propeller. The dangerous and difficult moment for such a perpendicularly ascending airplane is the point of transition from ascending to horizontal movement. It may easily drop downwards, or it may tilt over too much.

Both these faults are obviated by means of a stabilizing propeller, since this propeller—which rotates freely on or together with a wholly or partly perpendicular axle—will lift the machine when it has attained a suitable degree of forward movement, and at the same time excessive tilting will be prevented both by reason of the gyroscopic action and because the centre of gravity of the plane lies considerably lower than the stabilization center of force of the stabilizing propeller, so that a stable state of equilibrium will be established.

But in order that the qualities of the machine as a rapidly progressing airplane for practical purposes may not be impaired owing to the stabilizing propeller, this has been given a new form of construction, so that its blades can be "reefed" or diminished in size while it is rotating and its action be thus gradually brought to cease.

Simultaneously with or immediately after the "reefing," the outer frames of the propeller blades can be lowered down on to the upper supporting wings and serve as bracing stays for these wings. The tubes of these frames may be given a streamline cross-section, whereby they will not offer any obstructive resistance to the air or reduce the speed to any appreciable extent.

Other features and objects of the invention will be apparent from a consideration of the annexed drawings and the following detailed description wherein an exemplary embodiment of the invention is disclosed.

In the drawings:

Fig. 1 is a front elevational view of an airplane embodying the invention.

Fig. 2 is a perspective view of the airplane showing the stabilizing propeller in a rotatable position.

Fig. 3 is a top plan view of the airplane.

Fig. 4 is an enlarged sectional view of the central pillar construction for rotatably supporting the wings.

Fig. 4a is an elevational view showing a driving connection for one of the small propellers.

Fig. 5 is a sectional view of the turnplate associated with a rotatable wing.

Fig. 6 is a plan view of means for locking the wings in a bearing position.

Figs. 7, 7a, 7b and 7c are diagrammatic views of one form of stabilizing propeller, wherein the surface area can be varied.

Fig. 8 is a partial plan view of another type of stabilizing propeller.

Fig. 9 is a diagrammatic view of a "Venetian" blind type of stabilizing propeller.

Fig. 10 is a diagrammatic view illustrating the controls of the airplane.

Fig. 10a is a sectional view of a detail.

Fig. 11 is a sectional view showing part of the control system for the stabilizing propeller.

Fig. 12 is a diagrammatic view showing a mechanism for controlling the position of the stabilizing propeller.

Fig. 1 shows the machine in horizontal flight. 1 is the central pillar round which the wings can revolve. 2 is the frame of the upper propeller, which is now serving as stays for the supporting plane 3.

Fig. 2 shows the machine when rising or sinking. The wings and the stabilizing propeller are being made to move round by the small propellers 4.

Fig. 3 shows the airplane seen from above. The left-hand propeller 4' is pulling and the right-hand propeller 4" is pushing the wings round. These propellers may also, if desired, be placed, one or both, on the other side of the wings.

Fig. 4 shows on a larger scale one form of construction for the central pillar 1' with the rotating cylinder 5, to which the supporting wings 3' are attached. The right wing is here firmly attached to the rotating cylinder, while the left wing is fixed to a kind of turn plate 6, which is better shown in Fig. 5. The rotating cylinder is mounted to move on ball-bearings 7, both above and below. 8 is a central cylinder, to the top of which the stabilizing propeller 9 is firmly attached. The shaft or cylinder 8 can be raised when the airplane shall rise or sink and can be lowered when the machine shall fly straight forward. The frames 2' then press against the catches 10 on the upper side of the wings and serve as upper stays for the latter. 11 indicates motors and 12 spiral gearwheels which drive the shafts 13 for the propellers 4 of the wings.

Fig. 5 shows the turnplate 6, to which the long bearing-tube 14 of the left wing as well as its under-stay 15 is fastened. The knob 16 effects the rotation of the turnplate around the centre 17, so that the wing is in a bearing position in Fig. 5, and in propeller position when the turnplate is moved clockwise, as shown in dotted lines in Fig. 5.

The turnplate 6 is rotated automatically shortly before the wings are in transverse position by pulling a handle which causes the stopping-pin 18 to project and stop the knob 16, so that the plate is made to revolve and thereby also the wing 3'.

19 indicates slide-grooves in which the turnplate moves. They are firmly and solidly fixed to the cylinder, to which the wings are fastened.

Fig. 6 shows an arrangement for stopping the cylinder 5' in a middle position, or when the wings are in a bearing position. For this purpose two large pawls or catches 20 and 21 may be employed, which can be depressed into corresponding notches 22, 23 in the cylinder, when the pilot pulls the aforesaid handle which at the same time causes the left wing to turn, since by that action he draws back the bolts 24, 25 so that the pawls 20, 21 can slip down into their respective notches 22, 23, when these latter come opposite the pawls. The wings thus become firmly locked in the bearing position.

Fig. 7 shows how the stabilizing propeller can be "reefed" or shortened, when it is made in the form of a sail or tarpaulin which can be rolled up somewhat like a window-blind. 7a, 7b and 7c are sketches explaining Fig. 7.

Fig. 8 shows a construction executed as a flat-shaped drinking-cup made in sections which can be shoved into each other.

Fig. 9 shows the Venetian blind construction, where by turning the slats the wind-catching capacity of the stabilizing propeller can be increased or diminished.

In Fig. 10 is diagrammatically shown the pilot's seat and the handles he must make use of, as well as the connections of these handles, levers or wheels with the different parts of the airplane.

A wheel 26 is here shown in the position in which it is at the moment when the machine has just changed over from ascending to horizontal flight. This wheel serves to operate three mechanisms, which are necessary to secure precise transition from ascending to horizontal movement.

The wheel 26 actuates an endless screw 27 which engages a spiral gear-wheel 28, bearing a smaller gear-wheel 29, which engages a gear sector 30. The leverage movement of this latter is transmitted to the turnplate 6', which by means of the bolt 18' is swung round just at the moment when the rotating wings are on the point of stopping. The right wing is thereby turned round so as to act as a bearing wing. In the position shown in the drawings this has already been effected.

Through the lever 31 the wheel 26 further acts upon the lever 32, which acts on the gearing of the left motor and causes that propeller to reverse. This is effected when the stopping-bolt 33 is pushed up and strikes the arm 34 which is then driven over to the left and thereby reverses the gear 35. In the drawings this has also been effected.

The third operation performed by the wheel 26 is that it draws the hook 36 out of the spring 37, which thereupon shoves the bolt 38 into a hole in the rotating cylinder 5" which bears the wings. The bolt 38 penetrates into a hole 40 in the central cylinder 1" as shown in Fig. 10a, to which the spring itself is bolted or fixed and thereby locks the rotating cylinder in the middle position so that the bearing plane stands perpendicular to the longitudinal axis of the airplane, and the machine is ready for horizontal flight.

As the pilot on conclusion of the ascending movement can carry out the three operations from his seat by use of a single wheel, he can immediately afterwards concentrate all his attention on the important task of steering the machine correctly, when it is changing over to horizontal flight. What takes place automatically after he has turned the wheel 26 is the following:

(1) The right and left wings are stopped in their rotating movement and locked fast in the fixed cylinder in a middle position.

(2) The right wing is twisted, so that it becomes a bearing plane instead of being a propeller wing.

(3) The right-hand propeller is reversed, so that it draws the airplane forwards in the same manner as the other two propellers.

The transition from vertical to horizontal flight will be the most difficult moment in the procedure. In order to facilitate the manoeuvring of the machine during this period, the stabilizing propeller is employed, whereby the movements of the machine are rendered steadier, and it is prevented from sinking and heeling over too much. As the pilot now obtains full mastery over the machine and it is going steadily forwards, he can put the stabilizing propeller wholly or partly out of action, as he may desire, and thus increase the speed of the airplane.

This is accomplished by first "reefing" the blades of the stabilizing propeller and then lowering it so that the frames of the blades enter grooves on the upper surface of the two bearing planes and serve as stays therefore during horizontal flight. In order to effect this, the pilot first draws the handle 41 inwards towards himself, whereby he brings into action the rod 42 which stops the rotation of the ring 43 which is provided inside in the cylinder 44 with a vertical rod 45 which can wind up the wires that "reef" in or draw up the slats or canvas of the stabilizing propeller. This is shown more in detail in Fig. 11.

When the slats have been drawn to the shaft, the latter can be lowered and the frames of the blades allowed to grip the upper surface of the wings 3. To effect this, the pilot first shoves over the lever 46 which couples the drum 47 with the screw 48 which can be turned by the wheel 49. The pilot then turns the wheel 49 with the result that the stabilizing cylinder 44 is drawn downwards by the wire 50. The blade-frame is thereby lowered down to the upper surface of the wings 3, where it acts as a stay. Meanwhile, in order that these frames may fit exactly into position and automatically grip upon the longitudinal tubes or bars of the wings, the pilot must shove the lever 51 over to the other side, whereupon the bolt 52 is pushed up through the coupling muff 53 and stops against a cross-beam 54, which revolves together with the rotatable cylinder of the wings, when the said cylinder and the wing are revolving, but stands still when the wings are not moving.

Thus the beam now stands still, but the stabilizing propellers continue to revolve slowly, as the "reefed" propeller still acts as a propeller with very short blades. Also the framework of the stabilizing propeller contributes to produce the revolving movement. The above-mentioned bolt 52, which thus revolves together with the propeller shaft, will then stop up against the beam 54 and be precisely in that position when the frame lies directly over the longitudinal beams of the bearing wings. When the cylindershaft 44 is thereupon drawn farther down, the frame will be pressed by the action of springs against the upper beam of the bearing wings. As these latter have stopping catches at this place, and as the frame is provided with clawlike extensions, the connection between the frame and the bearing plane will be sufficiently solid, resilient and reliable, since during flight the wings will be pressed slightly upwards and the frame will press downwards with its outer, clawlike ends.

As the frames are furthermore curved slightly upwards in the middle, they will act still better as bracing stays on the upper surface of the wings.

The turning of the wheel 55 acts upon a stopping-bolt 56, which is raised or lowered through the fixed edge 57 of the fixed central cylinder. Right over this bolt lies the lever 58, which by rising or lowering acts upon the petrol supply arms 65. When the wings and their central cylinder are stationary, as during forward flight, the operation is quite simple, seeing that the raising of the bolt 56 lifts the lever 58, and more petrol moves into the carburettor. And on lowering the bolt, the reverse takes place.

Meanwhile, in order to regulate the supply of petrol during ascending and descending flight, the lever 58 is provided with a time-relay 59, or an air-regulator which takes one or two seconds to let the air out. When the central cylinder is revolving during perpendicular flight, the lever 58 will glide over the bolt 56 about once or twice per second according to the rapidity with which the wings revolve. If now the bolt 56 is raised, the lever 58 will be pushed upwards every time it passes over the bolt. But as the air-regulator keeps the lever raised for about one second, the latter will not move down to any appreciable degree before it again receives a push upwards. This means that it will remain in an almost constant position. And as the bolt 56 can be raised up and down to any height desired, the supply of petrol can consequently be regulated to the two side-motors, and the speed is thus controlled during the whole time when the airplane is ascending or descending.

The "reefing" of the propeller blades takes place in such a manner that the slats or the canvas, which have a loop of cord at the outer end, are drawn in along the frame by aid of a wire attached to the middle of the said loop. When the slats are to be drawn outwards in order to catch the wind, there is likewise employed for that purpose a wire attached to the same loop of cord and led back to the middle shaft through one of the tubes of the frame.

If telescopic blades are adopted, a similar arrangement with wires can be employed. The wings or propeller blades may be made of strong, closely-woven silk. In such case this fabric must in known manner run closely along the tubes of the frame, for instance down in the wings or in slits in the tubes or on rails along the tubes, so that the wind cannot pass between the tubes and the fabric.

The "reefing" is illustrated in Fig. 11 and can be performed by having in the cylinder 44 an upright rod 45, on which are placed four reels 60, in which the wire from the Venetian slats can be wound up. The wires are conveyed over rollers on to the reels 60. These reels and the wires are given such dimensions that each reel can wind up about 8 or 10 metres of wire with a diameter of 5 to 6 mm. The winding of the wires on the reels is accomplished in such a manner that the hauling-in wire is being wound up on the reel, while the hauling-out wire is being wound off from the reel. The winding-on and off is effected through the ring 43 at the bottom of the cylinder 44 being stopped in its rotation by the rod 42, as already mentioned, and the process of winding and unwinding the wire then takes place automatically. Therefore, by means of the handle 41, the pilot can at any time reduce or increase the action of the stabilizing propeller.

This propeller can, if desired, be made adjustable in vertical direction. In this case the cylinder-shaft 44', Fig. 12, is made to pass through a spherical bearing 61 in the roof of the central cylinder. And the lower end of the shaft can be movably attached to a worm-gear 62 which can be turned by aid of the screw 63 and the wheel 64. Thereby the shaft can be adjusted to right or left, forwards or backwards by moving its lower end, and the propeller will thus be able to steer the machine in all directions, upwards or downwards, to the left or to the right.

I claim:

1. In an airplane having a fuselage and a propeller, the combination of transverse supporting wings rotatably mounted on said fuselage, a vertical support for said wings, one of said wings being tiltable about its longitudinal axis, means for tilting said tiltable wing, means for rotating said supporting wings whereby said airplane may ascend and descend under the influence of said rotating wings, means for locking said wings against rotation whereby the latter assume their normal transverse position, and a stabilizing rotor above said supporting wings, adapted to stabilize the airplane during the transition of said wings from rotational movement into fixed transverse position.

2. The combination as claimed in claim 1 wherein the effective area of said stabilizing rotor may be varied.

3. In an airplane having a fuselage and a propeller, the combination of transverse supporting wings rotatably mounted on said fuselage, a vertical support for said wings, one of said wings being tiltable about its longitudinal axis, means for tilting said tiltable wing, means for rotating said wings whereby said airplane may ascend and descend under the influence of said rotating wings, means for locking said wings against rotation whereby the latter assume their normal fixed transverse position, a stabilizing rotor having propeller blades above said supporting wings, adapted to stabilize the airplane during the transition of said wings from rotational movement into fixed transverse position, and means for lowering said rotor whereby the blades thereof engage said supporting wings for supporting the latter.

ABRAHAM NILSEN HOVLAND.